(No Model.)

J. F. W. FAWCETT.
SPLIT PULLEY.

No. 528,662. Patented Nov. 6, 1894.

Inventor
John F. W. Fawcett.

Witnesses
Harry L. Amer
H. O. Riley

By his Attorneys.
C. A. Snow & Co.

UNITED STATES PATENT OFFICE.

JOHN F. W. FAWCETT, OF WEST SUPERIOR, WISCONSIN.

SPLIT-PULLEY.

SPECIFICATION forming part of Letters Patent No. 528,662, dated November 6, 1894.

Application filed March 22, 1894. Serial No. 504,677. (No model.)

*To all whom it may concern:*

Be it known, that I, JOHN F. W. FAWCETT, a citizen of the United States, residing at West Superior, in the county of Douglas and State of Wisconsin, have invented a new and useful Split Pulley, of which the following is a specification.

The invention relates to improvements in split pulleys.

The object of the present invention is to improve the construction of split pulleys, to increase their strength and durability, and to enable them to be readily and securely clamped on a shaft.

The invention consists in the construction and combination of parts hereinafter fully described, illustrated in the accompanying drawings and pointed out in the claims hereto appended.

Figure 1:
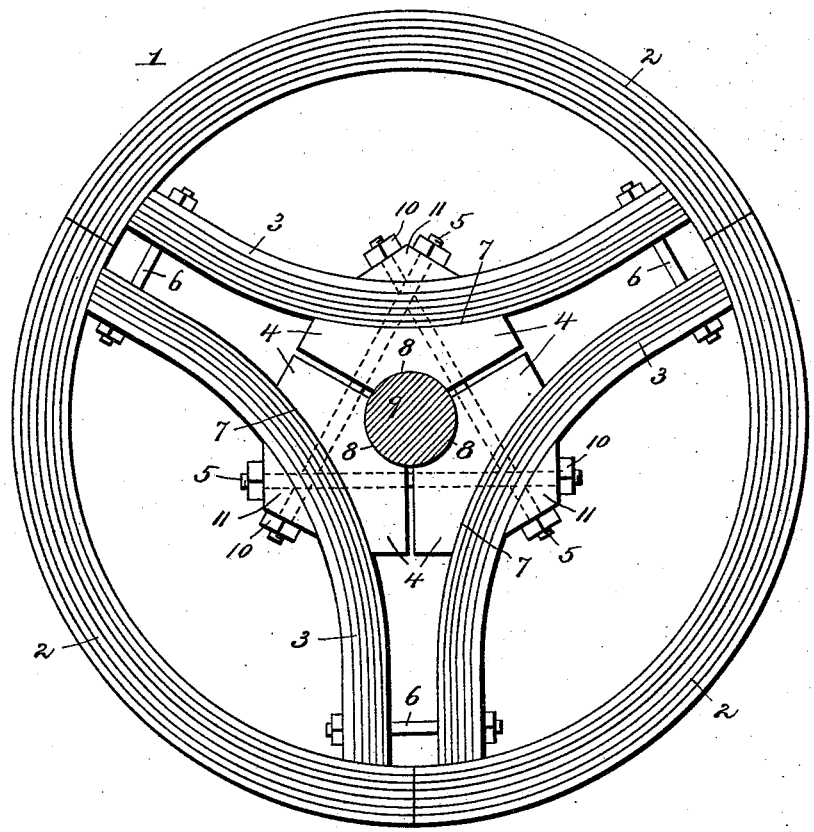
Figure 2:
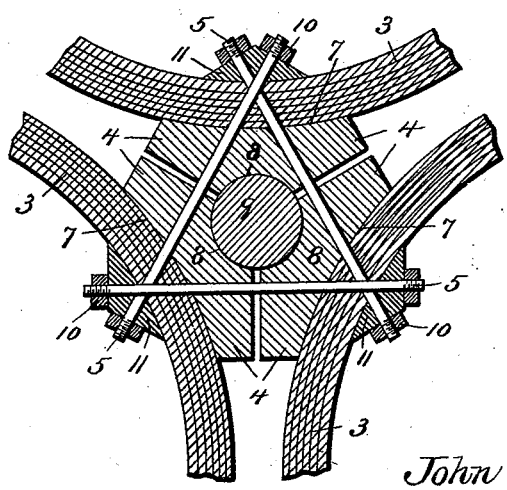

In the accompanying drawings:—Figure 1 is an elevation of a split pulley constructed in accordance with this invention. Fig. 2 is a sectional view of the same.

Like numerals of reference indicate like parts in both the figures of the drawings.

1 designates a sectional pulley rim, composed preferably of three sections 2, and constructed preferably of wood; but any other suitable material may be employed. The sections of the rim 1, are supported adjacent to their ends by curved braces or arms 3, extending inward from the ends of the sections and centrally secured to approximately triangular hub sections 4, by bolts 5. The curved arms or braces 3, are connected at their ends by bolts 6.

The approximately triangular hub sections have curved outer faces 7, to conform to the configuration of the adjacent convex faces of the arms or braces; and they are provided with inner curved bearing faces 8, forming a shaft opening and engaging and clamping a shaft 9. The bolts have each end threaded and provided with a nut 10. Their extended ends pass through triangular metallic plates 11, and they cross each other beyond or at the outer face of the curved arms or braces which are preferably constructed of wood.

The triangular plates 11, have slightly curved inner faces to conform to the configuration of the adjacent portions of the braces or arms and they present flat exterior faces to the nuts 10, to enable the hub sections to clamp securely a shaft without weakening the pulley. These plates 11 are of the same width as the curved arms or braces and extend across the pulley. The bolts 5, are arranged in the form of a triangle. They equalize the clamping action of the hub sections; and the latter have their adjacent faces sufficiently separated to enable their bearing faces 8, to clamp the shaft without their coming in contact with one another. This construction effectually prevents any weakening of the pulley at the point of attachment to a shaft and the consequent springing of the pulley at such point.

It will be seen that the pulley is simple and comparatively inexpensive in construction, that it possesses great strength and durability, that the parts may be readily adjusted and that the pulley is adapted to clamp a shaft equally at all sides without being weakened at the point of attachment.

Changes in the form, proportion and the minor details of construction may be resorted to without departing from the principle or sacrificing any of the advantages of this invention.

What is claimed is—

1. In a split pulley, the combination of a sectional rim, the inwardly curved braces having their ends arranged adjacent to each other and to the ends of the sections of the rim, a sectional hub arranged within the braces and provided with a central shaft opening, and the clamping bolts arranged in the form of a triangle and surrounding and receiving within them the shaft opening substantially as described.

2. In a split pulley, the combination of a sectional rim, the inwardly curved braces having their ends secured to the rim adjacent to the ends of the sections thereof, a hub arranged within the braces and composed of separate approximately triangular sections having inner bearing faces and outer faces conforming to the configuration of the braces, and the triangular arranged clamping bolts passing through the ends of the hub sections and the braces and having their ends crossed, whereby a continuous clamping action is produced, substantially as described.

3. In a split pulley, the combination of a sectional rim, curved braces having their ends arranged contiguous to the rim and extending inward therefrom, a sectional hub arranged within the braces, triangular plates arranged centrally on the braces and conforming to the configuration of the same and presenting flat exterior faces, and the crossed clamping bolts arranged in the form of a triangle and passed through the hub sections, the braces and the plates, and having threaded ends provided with nuts bearing against the exterior faces of the plates, substantially as described.

In testimony that I claim the foregoing as my own I have hereto affixed my signature in the presence of two witnesses.

JOHN F. W. FAWCETT.

Witnesses:
J. F. TOSTEVIN, Jr.,
WM. J. ALLEN.